(12) United States Patent
Kirst

(10) Patent No.: US 10,756,528 B2
(45) Date of Patent: Aug. 25, 2020

(54) THERMAL SLEEVE APPLICATOR

(71) Applicant: Artos Engineering Company, Brookfield, WI (US)

(72) Inventor: Michael A. Kirst, Pewaukee, WI (US)

(73) Assignee: Artos Engineering Company, Brookfield, WI (US)

( * ) Notice: Subject to any disclaimer, the term of this patent is extended or adjusted under 35 U.S.C. 154(b) by 185 days.

(21) Appl. No.: 15/898,810

(22) Filed: Feb. 19, 2018

(65) Prior Publication Data
US 2018/0241191 A1 Aug. 23, 2018

Related U.S. Application Data

(60) Provisional application No. 62/460,953, filed on Feb. 20, 2017.

(51) Int. Cl.
*H02G 15/18* (2006.01)
*H02G 1/14* (2006.01)

(52) U.S. Cl.
CPC ........... *H02G 15/1806* (2013.01); *H02G 1/14* (2013.01)

(58) Field of Classification Search
CPC ........ B23Q 7/14; B23Q 7/141; B23Q 7/1421; B23Q 7/1494; B25B 27/02; B25B 27/14; B25B 27/143; H02G 15/1806; H02G 5/18; H02G 1/14; H02G 1/16; Y10T 29/53526; Y10T 29/5353; B21D 39/04; H01R 43/00; H01R 43/20; H01R 43/052

USPC ........................................................ 29/281.5
See application file for complete search history.

(56) References Cited

U.S. PATENT DOCUMENTS

| 4,418,453 | A | * | 12/1983 | Brown | ................ | B29C 63/0069 |
| | | | | | | 29/33 M |
| 4,521,946 | A | * | 6/1985 | Dusel | ..................... | B65G 15/14 |
| | | | | | | 29/33 M |
| 7,363,703 | B2 | * | 4/2008 | Imgrut | ................. | H01R 43/005 |
| | | | | | | 29/235 |
| 2005/0087055 | A1 | * | 4/2005 | Ruchti | .................... | H01L 24/78 |
| | | | | | | 83/694 |

* cited by examiner

*Primary Examiner* — Tyrone V Hall, Jr.
*Assistant Examiner* — Abbie E Quann
(74) *Attorney, Agent, or Firm* — Andrus Intellectual Property Law, LLP

(57) ABSTRACT

A system and method for installing a section of heat shrink tubing on a wire is disclosed. The system includes an infeed guide that receives the continuous length of tubing and initially opens the tubing from a compressed condition. The continuous length of tubing is received in a cutting guide and cut to a desired length. After cutting, a pair of spaced support jaws move together to open the cut section of tubing. A funnel having a first opening and a second opening is moved into engagement with the section of tubing such that the second opening is received within the section of tubing. A wire is inserted into the funnel which guides the wire into the cut section of tubing. Once the wire is received within the cut section of tubing, the funnel and support jaws are removed and the wire is removed with the section of support tubing installed thereon.

13 Claims, 9 Drawing Sheets

THERMAL SLEEVE APPLICATOR

CROSS REFERENCE TO RELATED APPLICATION

The present application is based on and claims priority to U.S. Provisional Patent Application Ser. No. 62/460,953, file Feb. 20, 2017, the disclosure of which is incorporated herein by reference.

BACKGROUND

Presently, many different types of wire sections are used in a wide variety of applications, such as in the automotive industry. The wire sections can include terminals installed on one or both ends of the wire section. Alternatively, separate sections of wire can be connected to each other, such as by welding, crimping or soldering. In many applications, it is desirable to install a protective material around either the terminal after the terminal has been installed on the wire section or the joined section of the wires. This protective material is typically a heat shrink material that is heated after installation and shrinks onto the terminal and wire. If the terminal is small enough, the heat shrink material can be installed onto the wire section after the terminal has been applied. However, in applications in which the terminal size is larger than the opening to the tubular heat shrink material, the heat shrink material must be placed on the wire section prior to installation of the terminal. Currently, no automated solution exists for such application of the heat shrink material.

Therefore, a need exists for an automated method and system for applying the section of heat shrink tubing to the wire section.

SUMMARY

The present disclosure generally relates to a heat shrink inserter for installing a section of heat shrink tubing along a length of wire. More specifically, the present disclosure relates to a heat shrink inserter that is able to cut and install a section of heat shrink tubing on a length of wire prior to application of an end terminal to the wire.

The system of the present disclosure installs a section of tubing on a wire where the section of tubing is cut from a continuous length of tubing. The tubing includes an outer wall that defines an open interior. The continuous length of tubing has an initial, compressed condition in which the tubing wall has a generally flat profile including a pair of side edges. Prior to insertion on the wire, the section of tubing must be flexed from the initial condition to provide enhanced access to the open interior.

The system of the present disclosure includes an infeed guide that receives the continuous length of tubing when the continuous length of tubing is in the initial condition. In one embodiment of the disclosure, the continuous length of tubing is pulled through the infeed guide and between an infeed nip formed between a pair of pinch rollers. The pair of pinch rollers are separated from each other by a distance that is less than the width of the tubing when the tubing is in the initial condition. The pair of pinch rollers compress the side edges of the tubing wall to create a crease in the tubing sidewall.

After leaving the infeed guide, the continuous length of tubing is received within a cutting guide having a guide channel and a cutting slot where the cutting slot extends transverse to the guide channel. The cutting slot is aligned with a cutting blade of the heat shrink inserter. The cutting blade is selectively operable to cut a section of heat shrink tubing from the continuous length of heat shrink tubing, where the section of tubing has a predefined, determined length.

The system further includes a pair of spaced support jaws that each have receiving channel. The receiving channel on each of the support jaws are sized to receive one of the side edges of the continuous length of tubing when the continuous length of tubing is in the initial, compressed condition. The support jaws are each mounted to a support arm. The support arms are each movable to vary the distance between the support jaws such that the support jaws are movable between a receiving position, a flexing position and a release position. The receiving position is a position in which the support arms are able to receive and support the side edges of the section of tubing during cutting of the tubing from the continuous length of tubing.

The system further includes a funnel that has first and second halves that are movable toward and away from each other to define both an insertion condition and a separation condition. When the funnel is in the insertion condition, a first opening and a second opening are formed by the pair of mated first and second halves. The first opening has a diameter much larger than the second opening such that the funnel tapers from the first opening to the second opening. The second opening is formed as part of an insertion portion of the funnel.

During operation of the system, the continuous length of tubing is drawn into the infeed guide. In some embodiments, the system can include a pair of spaced pinch rollers and the continuous length of tubing is drawn through the pair of spaced pinch rollers. As the continuous length of tubing is pulled between the pair of spaced infeed pinch rollers, the infeed pinch rollers crease the tubing top and bottom locations, which are opposite from the side edges of the tubing. In other embodiments in which the tubing has a more open, tubular initial condition, the pinch rollers could be eliminated.

The continuous length of tubing is then pushed into the cutting guide and a cutting blade is moved to cut the continuous length of tubing to a desired length. As the continuous length of tubing is pushed into the cutting guide, a section of tubing that was previously cut is pushed out of the cutting guide and into a pair of support jaws with the support jaws in a receiving position. The pair of support jaws thus support the cut section of tubing as the cut section of tubing leaves the cutting guide.

Once the section of tubing is cut from the continuous length of tubing, the pair of support jaws are moved toward each other from the receiving position to a flexing position. In the flexing position, the outer end of the section of tubing opens from the initial, compressed condition.

Prior to moving of the support jaws from the receiving position to the flexing position, first and second halves of the funnel are moved toward each other from a separation condition to an insertion condition. When in the insertion condition, the first and second funnel halves form a first opening and a second opening where the second opening of the funnel is formed as part of an insertion portion. When the first and second halves of the funnel are aligned to form the funnel, the funnel is moved toward the support jaws as the section of tubing is flexed from the initial condition until the insertion portion of the funnel is received within the outer end of the section of tubing.

When in this position, the support jaws, the supported section of tubing and the funnel all move forward to insert the section of tubing over the wire that is being held by the wire processing machine or a person. Once the wire has been inserted into the section of tubing, the funnel is moved away from the pair of support jaws and the first and second halves of the funnel are moved away from each other. At this time the wire processing machine or person can move the wire forward to move the tubing further along the length of the wire if desired.

Once the funnel has been moved out of engagement with the section of tubing and the machine or person is finished moving the section of tubing over the wire, the support jaws are moved away from each other from the flexing position to a release position. The support jaws and funnel move back toward the cutting guide. When the support jaws are in the release position, the section of tubing is released and is supported only on the wire section. The wire section can then be removed from the heat shrink inserter and further processing carried out on the heat shrink tubing once a terminal is installed.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
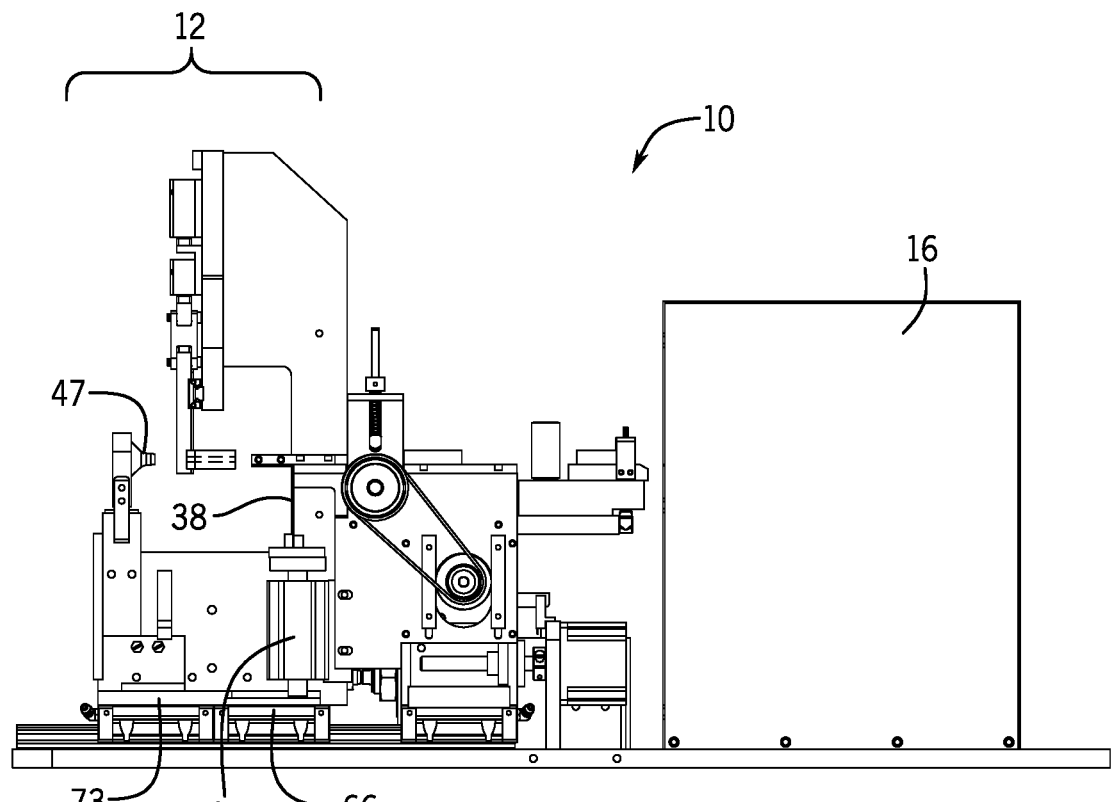
FIG. 1 is a view of the heat shrink inserter of the present disclosure.

FIG. 1 illustrates a heat shrink inserter 10 constructed in accordance with the present disclosure. The heat shrink inserter 10 includes an inserter head 12 that is operable to cut and apply a section of heat shrink tubing onto the end of a wire. The heat shrink inserter 10 draws a continuous length of heat shrink tubing into the inserter head 12 using a feed drive and subsequently cuts the heat shrink tubing to a desired length and applies the section of cut tubing onto the wire for further processing. The continuous length of heat shrink tubing is typically wound onto a reel or spool or is supplied in a long, straight section (not shown) and is drawn into the heat shrink inserter 10 in a manner to be described below. Prior to being drawn into the heat shrink inserter 10, the heat shrink tubing 28 has a generally flat or oval profile in which the outer tubing wall 11 and the open interior 15 are both compressed from the normal, tubular shape to create a pair of spaced side edges 13 (FIG. 15A).

Referring back to FIG. 1, the heat shrink inserter 10 includes a control enclosure 16 that houses all of the controls needed to operate the heat shrink inserter 10. The controls enclosed within the enclosure 16 could be one or more PLC controllers or could be a microprocessor based controller. The controls for the heat shrink inserter 10 can be located near the heat shrink inserter 10 as shown or can be located away from the inserter and connected with cabling. The control enclosure 16 is coupled to a valve bank (not shown) that controls the application of pressurized air to the various components used to operate the heat shrink inserter 10.

Figure 3:
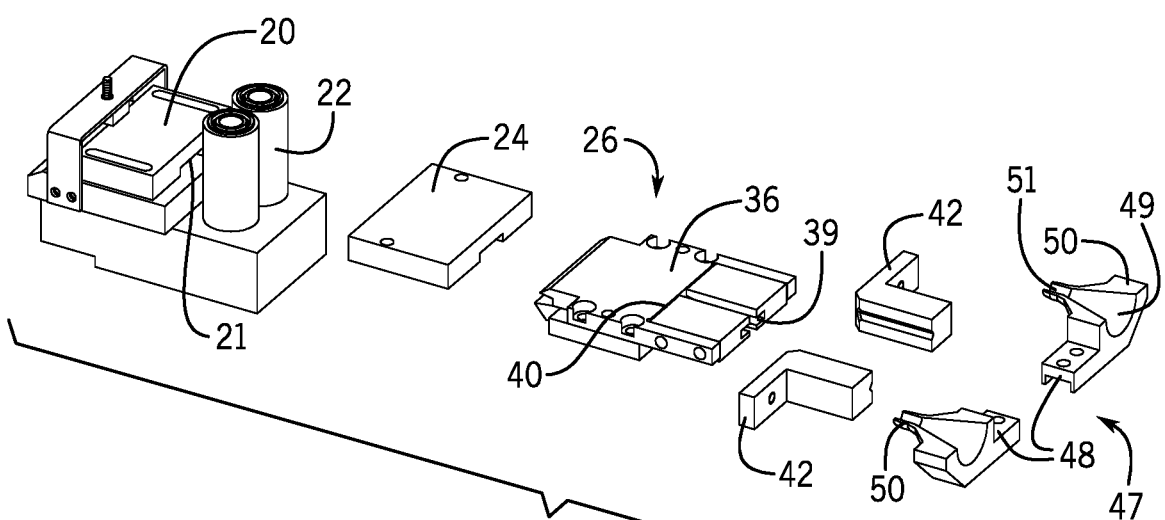
FIG. 3 is an exploded view of a tool pack for a specific type of heat shrink tubing.
Figure 2:
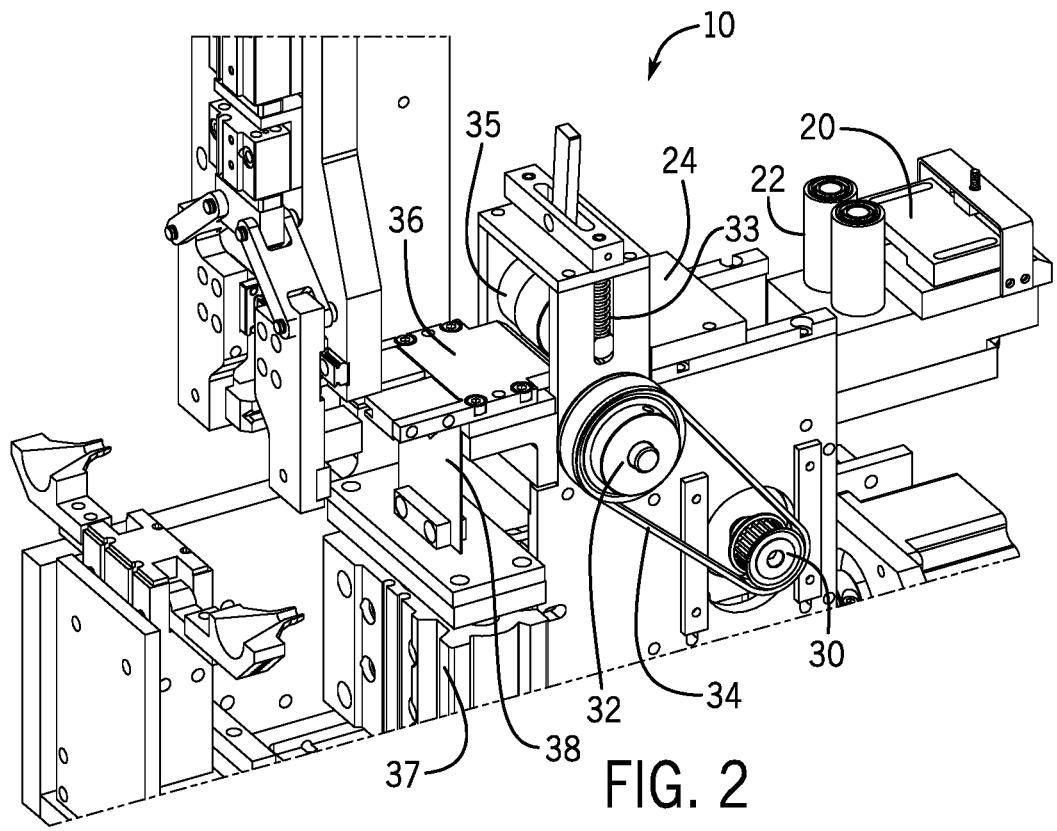
FIG. 2 is a magnified view showing the operating components of the heat shrink inserter.

FIG. 2 more clearly illustrates the operational components of the heat shrink inserter 10. The inserter 10 includes an infeed guide block 20, at least a pair of pinch rollers 22 and a roller guide 24. In embodiments in which the continuous length of tubing has a more open initial condition, the pinch rollers 22 could be eliminated. As illustrated in FIG. 3, guide block 20, pinch rollers 22 and roller guide 24 are part of a tool pack 26. Each of the members of the tool pack 26 is specifically sized based on the size of the heat shrink tubing and can be removed and replaced from the heat shrink inserter 10 depending desired size of heat shrink material to be installed on the section of wire. It is contemplated that when the inserter 10 is used with different size tubing, the entire tool pack 26 will be removed and replaced.

Figure 4:
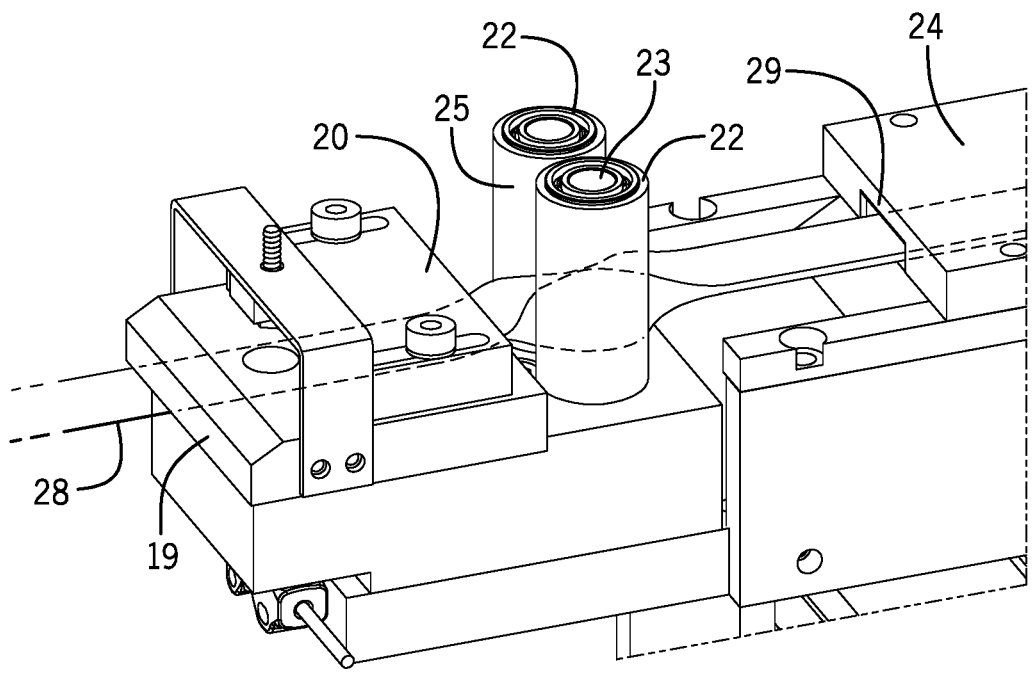
FIG. 4 is a magnified view of the pinch rollers and heat shrink tubing.
Figure 15A:
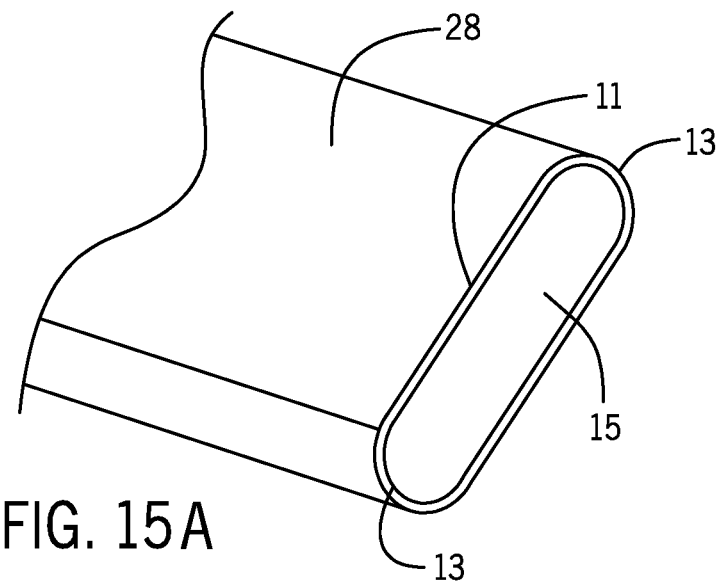
FIG. 15A is a view of the heat shrink tubing in the initial, compressed condition.
Figure 15B:
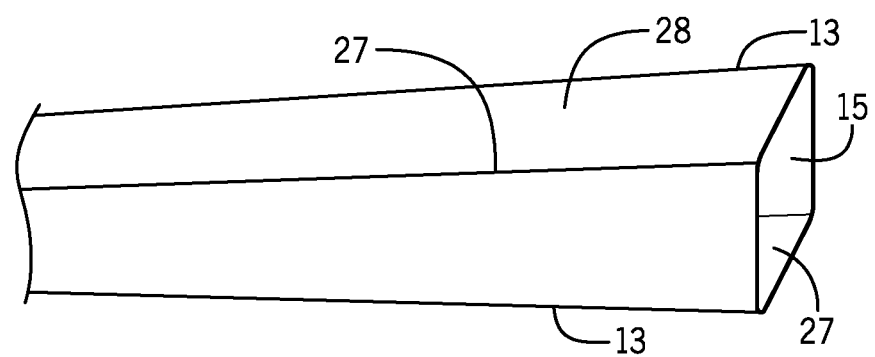
FIG. 15B is a view of a cut portion of heat shrink material prior to application to a wire section.

The infeed guide block 20 includes a guide channel 21 having a width that corresponds to the width of the heat shrink tubing 28 in the compressed condition shown in FIG. 15A. As shown in FIG. 4, the heat shrink tubing 28 is provided as a length of continuous tubing that enters into the guide block 20 at the upstream end 19 in the generally, compressed initial condition. The length of heat shrink tubing 28 passes through the guide channel 21 in the guide block 20 and is directed between the pair of pinch rollers 22. The pair of pinch rollers 22 are each freely rotatable about a generally vertical mounting shaft 23 and are separated by a gap that creates an infeed nip 25. The close positioning of the pinch rollers 22 causes the continuous length of heat shrink material 28 to pinch together to create a generally diamond shape, as shown in FIG. 15B. FIG. 15B shows the section of heat shrink tubing 28 pinched to form the diamond shape to create top and bottom creases 27 opposite the side edges 13. The pinch rollers help to open the interior 15 prior to the further processing to be described. Although the pinch rollers 22 may be required for many types of heat shrink tubing, other types of heat shrink material have a round cross section and the pinch rollers 22 could be eliminated. The heat shrink material is shown and described as being in the shape of a tube. However, it is contemplated that the heat shrink material could have other cross sectional shapes as long as the outer wall defines an open interior 15.

As shown in FIG. 4, after the tubing 28 leaves the pinch rollers 22, the tubing generally returns to the flat, compressed initial condition before reaching the roller guide 24.

However, the tubing 28 will include the top and bottom creases, which will facilitate opening of the interior during downstream processing.

Referring back to FIG. 2, the continuous length of heat shrink material is drawn through the pair of pinch rollers 22 by operation of an electric motor that rotates a drive pulley 30. The drive pulley 30 includes a series of teeth that engage a drive belt 34. The drive belt 34, in turn engages the drive roller 32. A pressure roller 35 is spring-biased into contact with the drive roller 32 by a pair of bias springs 33 to create an infeed nip. The rotation of the drive roller 32 and the pressure roller 35 pulls the continuous length of heat shrink tubing through the pair of pinch rollers 22 and the roller guide 24. The spring bias could be replaced with other components, such as an air cylinder, motor or other device to apply pressure. The electric motor used to rotate the drive pulley 30 is controlled by the controls included within the control enclosure 16.

As shown in FIG. 4, after being pulled through the pinch rollers 22, the continuous length of tubing enters into a guide channel 29 of the roller guide 24. The guide channel 29, like the guide channel 21 of the infeed guide block 20, has a width that corresponds to the width of the heat shrink tubing and is selected to form part of the tool pack accordingly.

Referring back to FIG. 2, after leaving the roller guide 24, the continuous length of tubing enters into a cutting guide 36. The cutting guide 36 has an internal guide channel that received the continuous tubing and guides the tubing through the cutting guide 36. When the tubing is in the guide channel, the cutting guide 36 positions the length of heat shrink material in alignment with a movable cutting blade 38. The cutting blade 38 is reciprocally movable by the operation of one or more air cylinders 37 and enters into the cutting slot 40 formed in the cutting guide 36 as best shown in FIG. 3. In this manner, the cutting blade 38 is able to cut the continuous length of heat shrink tubing into a tubing section having a desired length.

Figure 5:
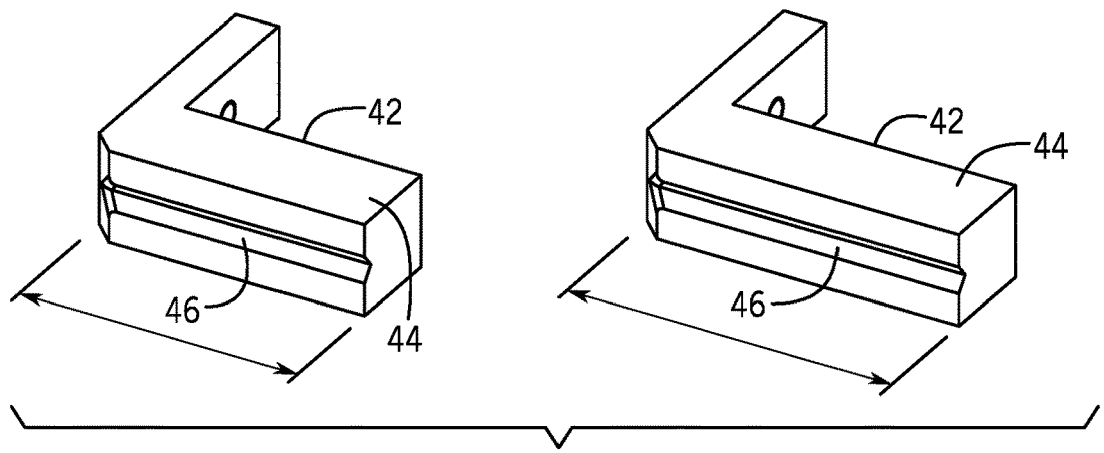
FIG. 5 is a view of two embodiments of the support jaws.

As illustrated in FIG. 3, the tool pack 26 includes a pair of support jaws 42 that support the length of cut heat shrink material during installation onto the wire. As shown in FIG. 5, the support jaws 42 can have different lengths depending upon the length of heat shrink tubing to be installed onto the wire. Each support jaw 42 includes a support portion 44 that includes a center channel 46 that receives the length of heat shrink tubing. In the embodiment shown in FIG. 5, the support jaws 42 have a length of either 30 millimeters or 40 millimeters. However, it should be understood that other lengths could be utilized while operating within the scope of the present disclosure.

Referring back to FIG. 3, the tool pack 26 further includes a pair of funnels blocks 48 that combine to create a funnel that is used to insert the cut section of heat shrink tubing onto the wire. Each funnel block 48 includes a funnel half 50. The funnel halves 50 combine to form a funnel 47 when the funnel blocks 48 are moved adjacent to each other, as shown in FIG. 1. As can be understood in FIG. 3, the combined funnel 47 has an open first end 49 and an open second end 51 defined by the internal funnel wall. The diameter of the open first end 49 is much larger than the diameter of the open second end 51, as can been seen in FIG. 3. The operation of the formed funnel will be discussed in greater detail below.

Figure 6:
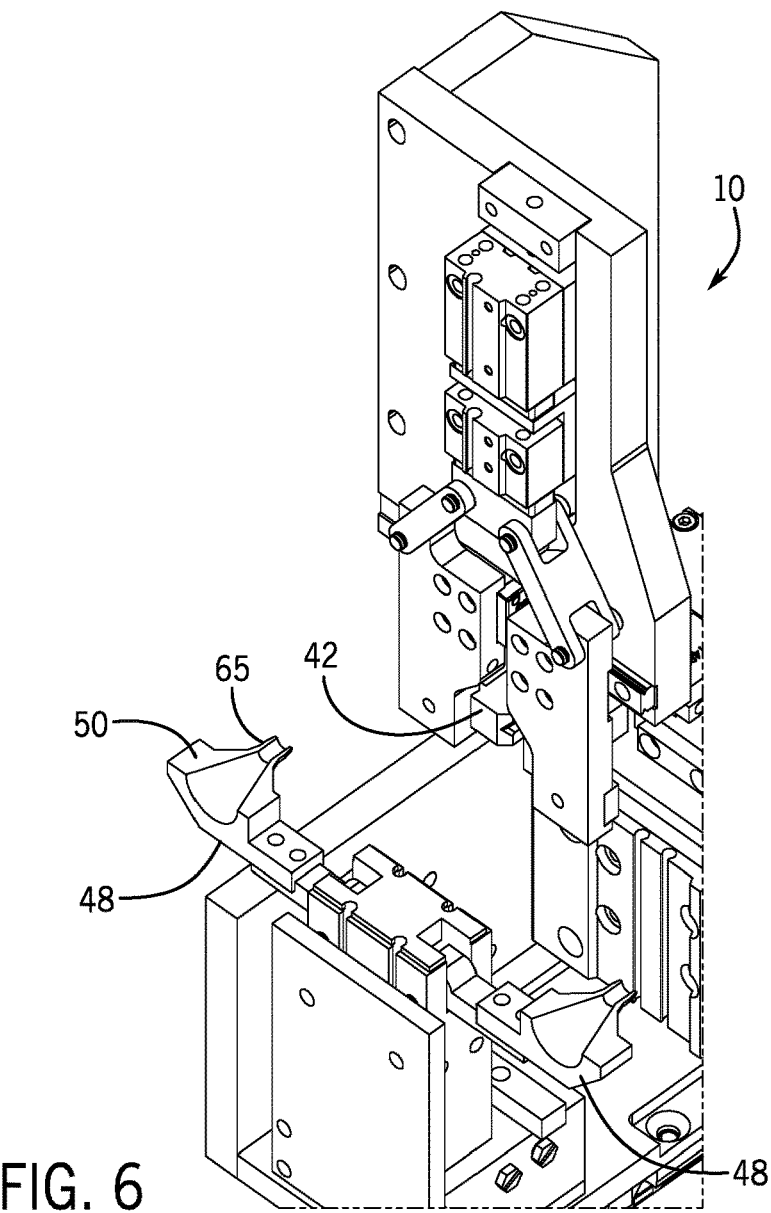
FIG. 6 is an initial view of the heat shrink inserter.

The operation of the heat shrink inserter 10 will now be described with reference to the remaining figures. Initially, the heat shrink tooling pack 26 is installed onto the heat shrink inserter 10. The heat shrink tooling pack 26 is designed for a specific type of heat shrink tubing and for a desired length of heat shrink tubing to be cut and installed onto a length of wire. Once the tool pack 26 has been selected and installed as shown in FIG. 2, the operator enters instructions into the control unit utilized to operate the heat shrink inserter. Once entered, the heat shrink inserter goes through an adjustment sequence to configure the machine for the type and length of heat shrink material. FIG. 6 illustrates the initial position of the heat shrink inserter 10 prior to operation. In this position, each of the funnel blocks 48 and funnel halves 50 are in a retracted position. Further, the pair of jaws 42 is in a receiving position.

Figure 7:
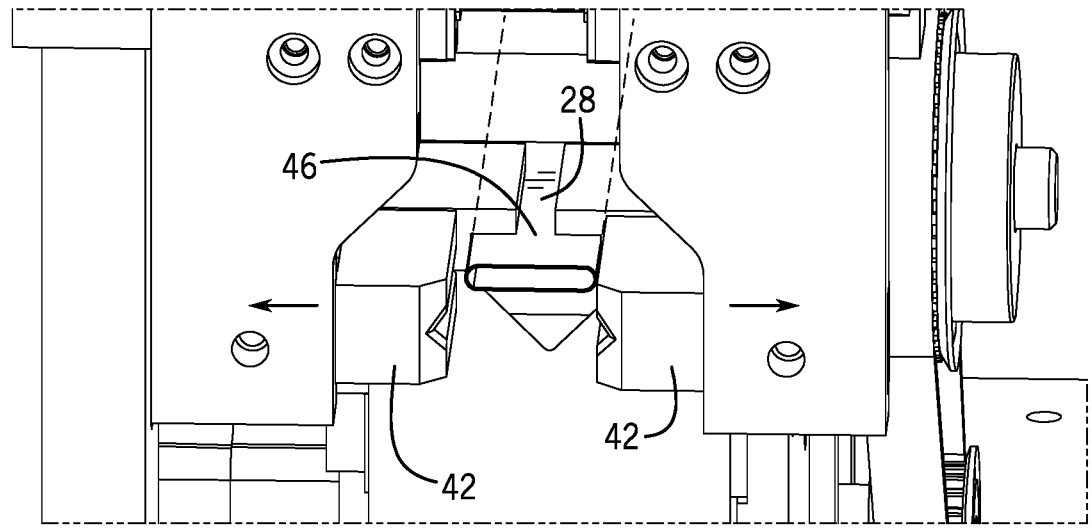
FIG. 7 illustrates a portion of the heat shrink tubing in the compressed condition within the cutting guide.

As shown in FIG. 7, the continuous length of the heat shrink tubing 28 is located between the pair of support jaws 42 such that the tubing 28 is received within the pair of center channels 46 formed in the jaws 42. The heat shrink tubing is in the initial, compressed condition and is fed through operation of the drive motor which causes rotation of the driven roller 52 beneath the pressure roller 54 as shown in FIG. 2. As discussed previously, the driven roller 52 is controlled by operation of an electric motor through a belt and pulley system. However, different types of drive mechanisms are contemplated as being within the scope of the present disclosure.

Once in position, pressurized air is supplied to drive cylinders 37 shown in FIG. 1 to cause the cutting blade 38 to move upward and sever a portion of the heat shrink tubing from the continuous length of material. The heat shrink tubing is supported within the cutting guide 36 as it is being cut. After the section of tubing has been cut, the continuous length of tubing is advanced and the cut section of tubing is pushed into the support jaws 42.

Figure 8:
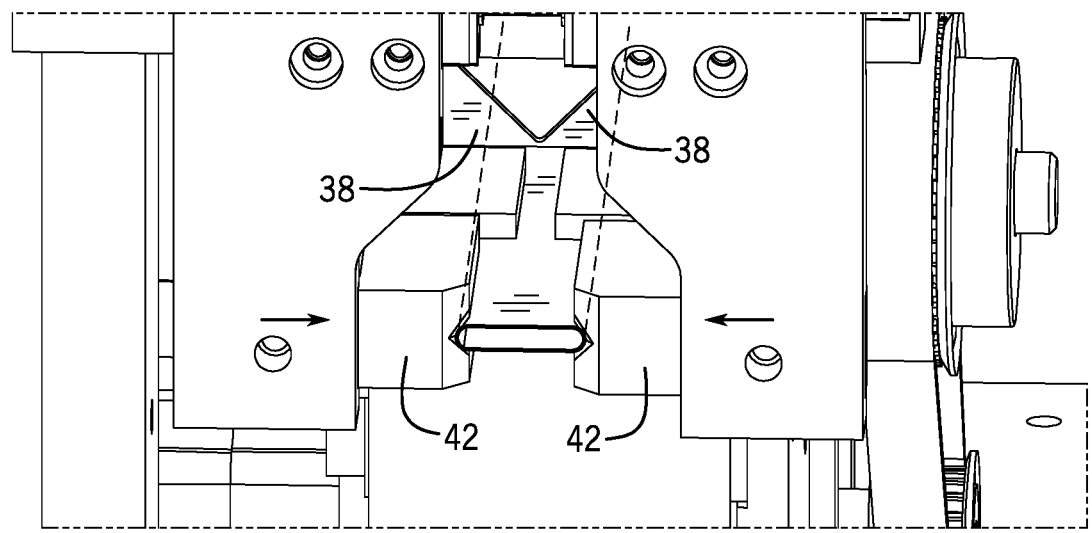
FIG. 8 is a view showing the cutting blades separating the section of tubing from the continuous length of tubing.

As illustrated in FIG. 8, after the heat shrink material has been cut, the jaws 42 are in a receiving position in which the spacing between the support portions of the jaws are separated by a distance that allows the section of tubing to be pushed into the support jaws 42. When the section of tubing is pushed out of the cutting guide, the section of tubing is supported within the center channels 46 of the support jaws.

Figure 9A:
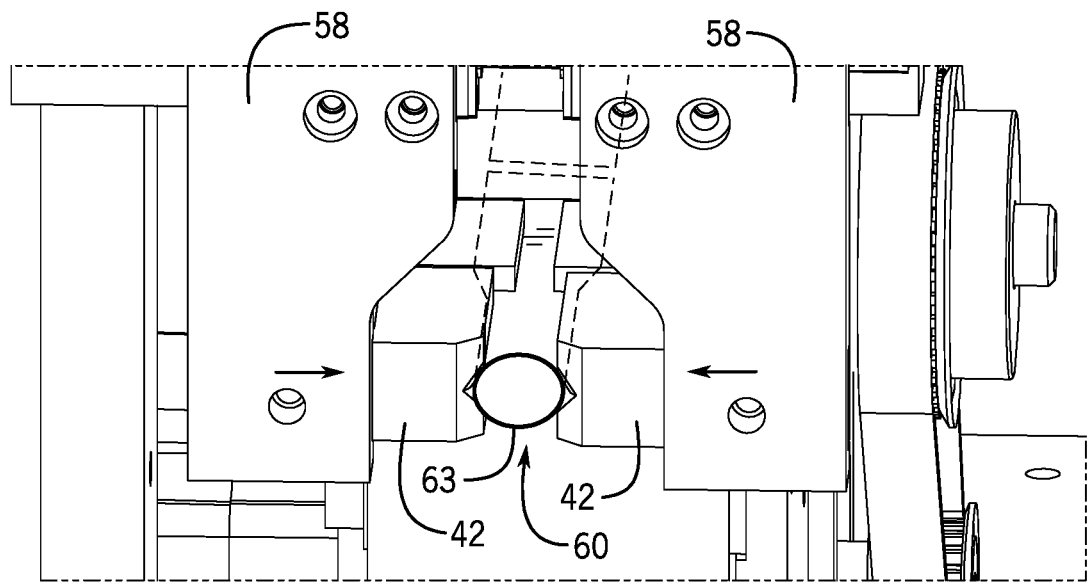
FIG. 9A is a view showing the movement of the support jaws to pinch the cut section of heat shrink tubing.
Figure 9B:
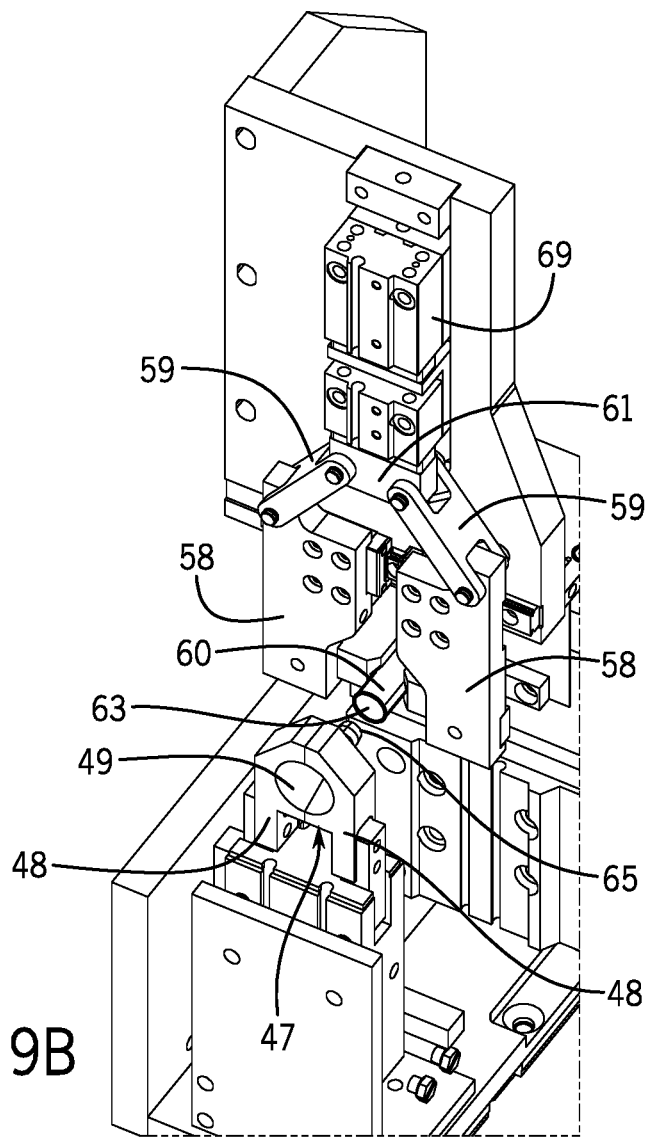
FIG. 9B is a view similar to FIG. 9A showing the opening of the outer end of the cut section of heat shrink tubing.

Referring now to FIGS. 9A and 9B, after the length of heat shrink tubing has been cut by operation of the cutting blade and fed forward into the support jaws 42, the support jaws 42 are moved closer together to a flexing position through operation of the support arms 58. The support arms 58 are mounted to link arms 59, which are connected at opposite ends to a movement block 61. The movement block 61 is vertically movable through the operation of air cylinders 69 which are controlled by the control unit. When the jaws 42 are moved together into the flexing position as shown in FIG. 9A, the section 60 of the heat shrink tubing flexes inwardly such that an outer end 63 of the tubing opens into a generally open, receiving position. In this position, enhanced access is provided to the open interior of the section of tubing cut from the continuous length as compared to the compressed condition shown in FIG. 15A.

Once the tubing section 60 is flexed to the open position, the pair of funnel blocks 48 are brought together such that the funnel halves 50 combine to form the funnel 47 having the first opening 49 and the second opening included on the insertion portion 65. The insertion portion 65 of the funnel 47 can be inserted into the open outer end 63 of the section of heat shrink tubing. Although the pair of funnel blocks 48 are shown in FIG. 9B, it should be understood that the funnel 47 could be eliminated depending upon the type of heat shrink material and the size of the wire. For example, if the heat shrink material is much larger than the wire size, the funnel blocks 48 may be eliminated.

Figure 10:
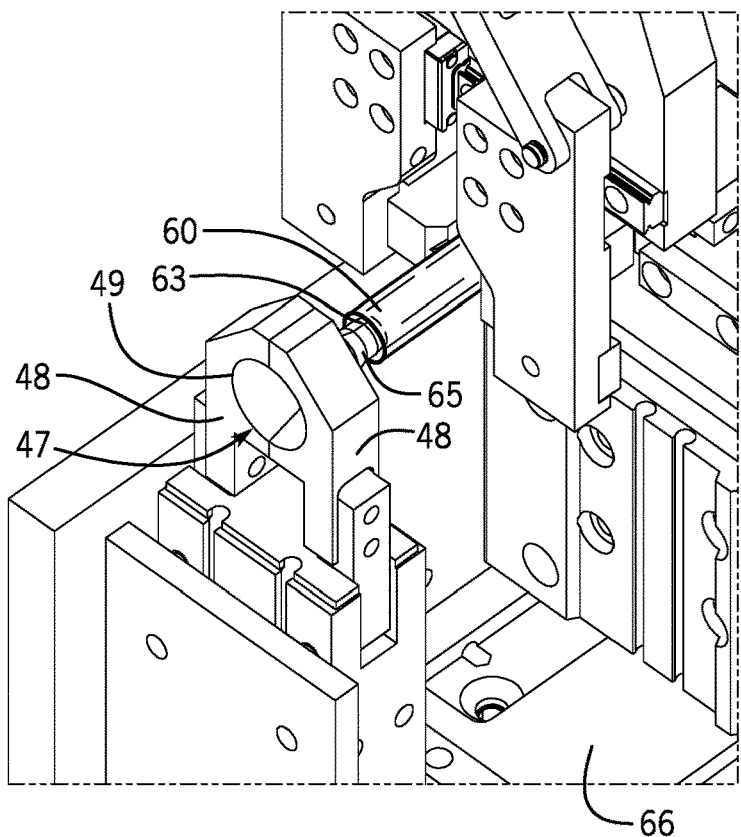
FIG. 10 is a further sequential image showing the insertion of the funnel into the open outer end of the section of heat shrink tubing.

Referring now to FIG. 10, when the funnel blocks 48 are brought together, the funnel halves 50 define the first opening 49. The first opening 49 leads into the insertion portion 65, which is of much smaller diameter. In the position shown in FIG. 10, the funnel 47, and specifically the insertion portion 65, has been moved toward the section of heat shrink tubing, until the insertion portion 65 is received within the open outer end 63 of the section of heat shrink material. The movement of the funnel 47 is controlled by the movement of carriage 73 shown in FIG. 1. Once the funnel is inserted into the open outer end 63 of the section 60 of the heat shrink tubing, a cut wire section can be moved into position utilizing a wire gripping jaw (not shown).

Figure 11:
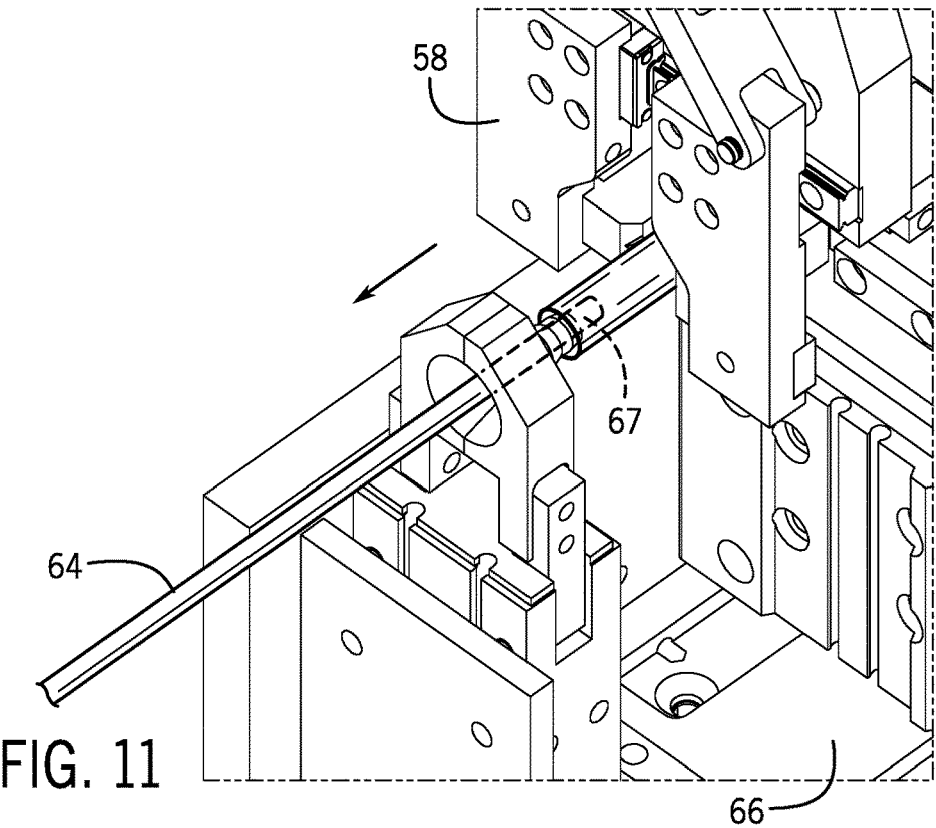
FIG. 11 illustrates a wire section being inserted into the open outer end.

Once the wire 64 is in position as shown in FIG. 11, the combination of the funnel and support jaws are moved toward the wire 64 through movement of the carriage 66 that supports the arms 58 and the carriage 73. During this movement, the end 67 of the wire 64 extends through the length of the section 60 of the heat shrink tubing.

Figure 12:
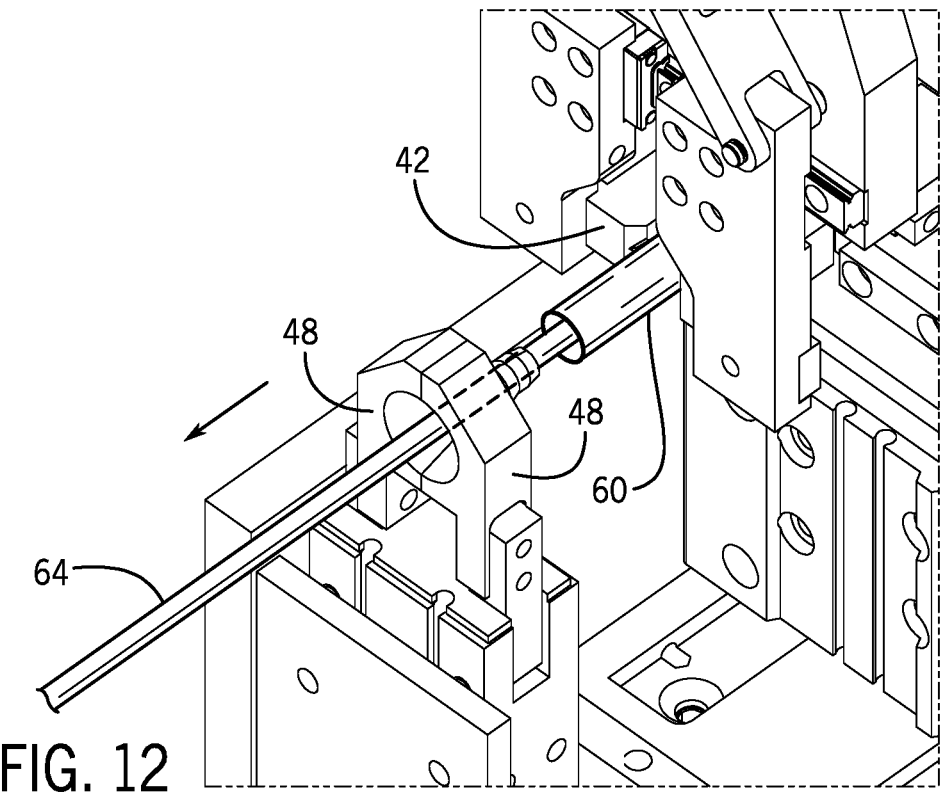
FIG. 12 further shows the movement of the funnel away from the open outer end of the section of heat shrink tubing.
Figure 13:
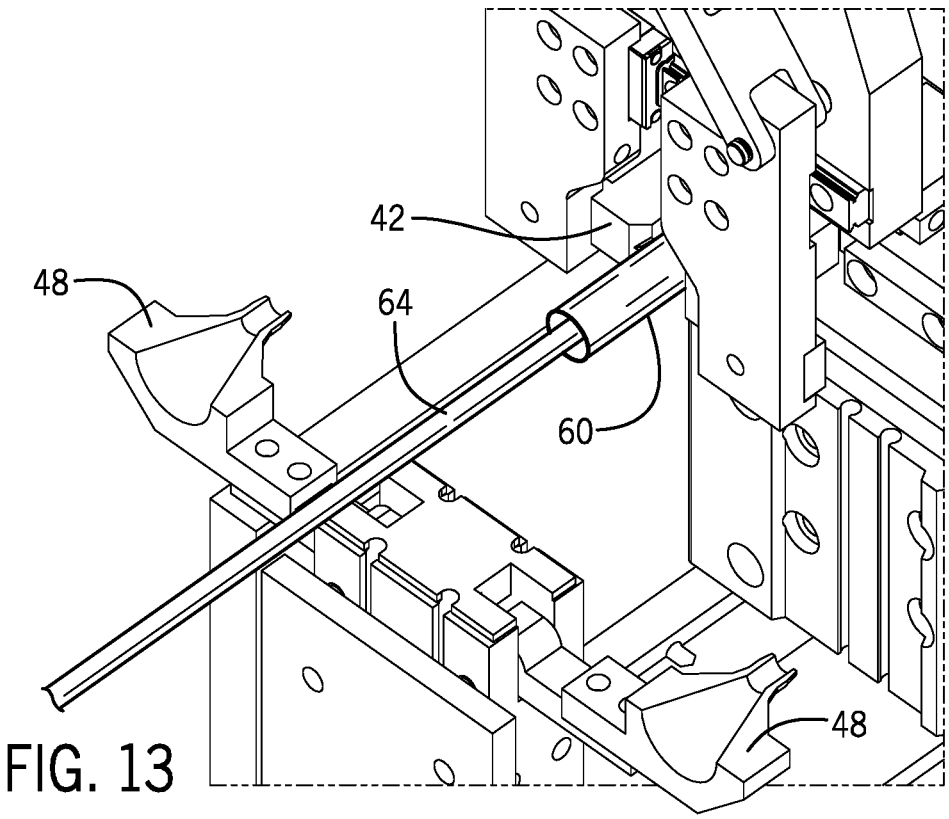
FIG. 13 shows the retraction of the funnel sections application of the section of heat shrink tubing to the wire.

Once the wire section 64 is in position relative to the section of tubing 60, the funnel blocks 48 are moved away from the jaws 42 and section of tubing 60, as shown in FIG. 12. After being moved away from the section of tubing, the funnel blocks 48 are opened as shown in FIG. 13. It should be understood in FIGS. 11-13 that the wire gripper jaws are not shown for clarity purposes. However, the wire 64 would be supported throughout the application process by the wire gripper jaws or by an operator.

Figure 14:
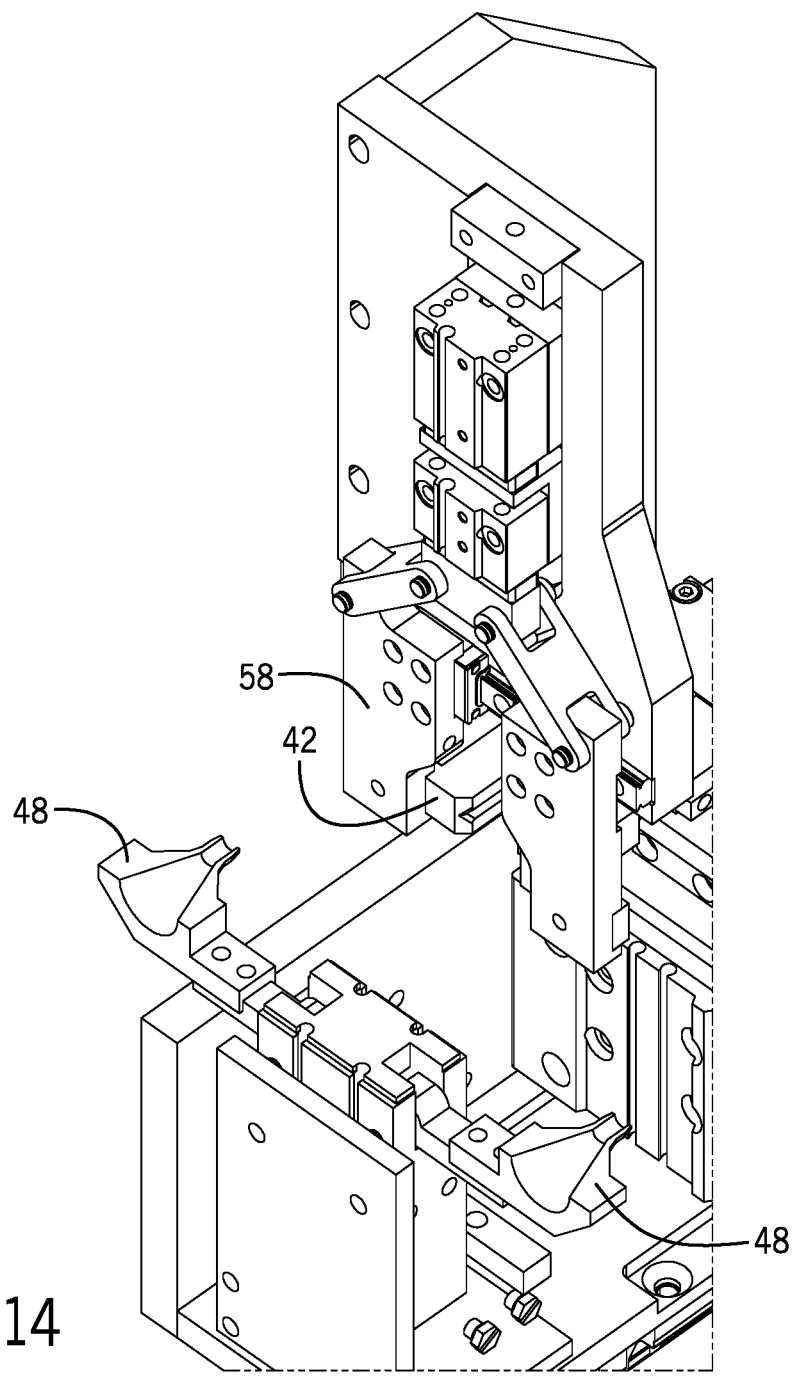
FIG. 14 illustrates the sequential step of preparing the heat shrink inserter for the next section of heat shrink tubing.

Once the section of heat shrink tubing 60 has been applied to the wire 64, the support jaws 42 are moved away from each other to a release position. In the release position, the distance between the support jaws 42 is greater than the width of the tubing section 60 such that the tubing section 60 is released from the support jaws 42 and is supported only on the wire 64. Once this has occurred, the wire 64 is removed and the funnel blocks 48 and jaws 42 return to their retracted position awaiting the next section of heat shrink material to be cut, as shown in FIG. 14.

Referring back to FIG. 1, the jaws 42 are mounted to the carriage 66 and funnel blocks 48 and funnel halves 50 are mounted to the carriage 73 that are each movable laterally through the operation of air cylinders. The carriage 66 allows the cut portion of heat shrink material, when supported between the jaws 42 and the funnel halves to be inserted onto the cut portion of wire.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A system for installing a section of tubing on a wire, the section of tubing being formed from a continuous length of tubing having a tubing wall surrounding an open interior, the system comprising:
   an infeed guide that receives the continuous length of tubing;
   a cutting guide that includes a guide channel and a cutting slot extending transverse to the guide channel;
   a pair of spaced support jaws each having receiving channel sized to receive one side of the continuous length of tubing;
   a pair of support arms that each receive one of the support jaws, wherein the support arms are operable to move the support jaws between a receiving position, a flexing position and a release position; and
   a funnel having a first opening and a second opening, the funnel being formed from a first half and a second half that are moveable toward and away from each other to define an insertion condition and separation condition.

2. The system of claim 1 wherein the first and second halves of the funnel are each mounted to a pivot arm, wherein the pivot arm are operable to move the first and second funnel halves between the insertion condition and the separation condition.

3. The system of claim 1 wherein the infeed guide includes a pair of pinch rollers separated from each other by a distance less than a width of the tubing in an initial condition.

4. The system of claim 1 wherein the funnel and the pair of spaced support jaws are each supported on a carriage, wherein the carriage is movable toward and away from the cutting guide.

5. The system of claim 1 wherein the pair of support jaws each have a length corresponding to the length of tubing installed on the wire.

6. The system of claim 1 wherein the first opening of the funnel has a greater diameter than the second opening of the funnel.

7. The system of claim 6 wherein the diameter of the second opening of the funnel is less than a diameter of the open interior of the tubing.

8. The system of claim 7 wherein the funnel is movable toward and away from the support arms such that the second opening of the funnel can be inserted into the open interior of the tubing.

9. The system of claim 1 further comprising a cutting blade aligned with the cutting slot of the cutting guide, wherein the cutting blade is operable to cut the tubing when the tubing is received in the guide channel of the cutting guide.

10. The system of claim 1 further comprising a drive roller that contacts the tubing and is operable to pull the tubing through the infeed guide and into the cutting guide.

11. A system for installing a section of tubing on a wire, the section of tubing being formed from a continuous length of tubing having a tubing wall surrounding an open interior, wherein the tubing wall includes a pair of side edges in an initial condition, the system comprising:
   an infeed guide that receives the continuous length of tubing in the initial condition and pinches the pair of side edges toward each other to partially deform the continuous length of tubing; from the initial condition;
   a cutting guide that includes a guide channel and a cutting slot extending transverse to the guide channel;
   a pair of spaced support jaws each having receiving channel sized to receive one of the side edges of the continuous length of tubing;
   a cutting blade aligned with the cutting slot of the cutting guide, wherein the cutting blade is operable to separate the section of tubing from the continuous length of tubing when the continuous length of tubing is received in the guide channel of the cutting guide and the receiving channels of the pair of spaced support jaws;
   a pair of support arms that each receive one of the support jaws, wherein the support arms are operable to move the support jaws between a receiving position, a flexing position and a release position; and
   a funnel having a first opening and a second opening, the funnel being formed from a first half and a second half that are moveable toward and away from each other to define an insertion condition and separation condition;

wherein the funnel is movable toward and away from the section of tubing when the section of tubing is supported in the receiving channels of the pair of spaced support jaws.

12. The system of claim 11 wherein the first and second halves of the funnel are each mounted to a pivot arm, wherein the pivot arm are operable to move the first and second funnel halves between the insertion condition and the separation condition.

13. The system of claim 11 wherein the first opening of the funnel has a greater diameter than the second opening of the funnel and the diameter of the second opening of the funnel is less than a diameter of the open interior of the tubing.

* * * * *